United States Patent [19]

Shomo

[11] 4,417,745

[45] Nov. 29, 1983

[54] FOLDING BICYCLE

[76] Inventor: Robert D. Shomo, 22303 Fairfax, Taylor, Mich. 48180

[21] Appl. No.: 243,896

[22] Filed: Mar. 16, 1981

[51] Int. Cl.³ .............................................. B62K 15/00
[52] U.S. Cl. .................................... 280/287; 74/551.3; 74/594.7
[58] Field of Search .................. 280/287, 278; 403/93; 74/594.7, 594.4, 551.3, 551.4, 551.6, 551.7

[56] References Cited

U.S. PATENT DOCUMENTS

| 569,354 | 10/1896 | Ryan | 280/287 |
| 598,811 | 2/1898 | Percival | 280/287 |
| 626,396 | 6/1899 | Smith | 280/287 X |
| 693,521 | 2/1902 | Ishoy | 280/287 |
| 1,096,504 | 5/1914 | Grossman | 280/287 |

FOREIGN PATENT DOCUMENTS

| 1106626 | 5/1961 | Fed. Rep. of Germany | 280/278 |
| 867888 | 12/1941 | France | 74/594.7 |

Addition to No. 18925

| 15225 | of 1891 | United Kingdom | 74/551.4 |
| 1896 | of 1897 | United Kingdom | 74/551.4 |
| 395697 | 7/1933 | United Kingdom | 74/551.3 |

*Primary Examiner*—John A. Pekar
*Attorney, Agent, or Firm*—Robert G. Mentag

[57] ABSTRACT

A folding bicycle with a hinged frame comprising a front portion and a rear portion. The front and rear frame portions are connected by a hinge structure which permits the front frame portion to be rotated about the vertical axis of the hinge structure to a position against the rear frame portion for easy carrying or for insertion into a carrying bag. The folding bicycle is provided with a folding handlebar assembly which can be quickly adjusted from a standard ten speed driving configuration to a more relaxed touring handlebar configuration, or to a fully collapsed compact carrying position. The folding bicycle is provided with an adjustable soft ride seat, and with pedals which are reversible to reduce the overall width of the collapsed bicycle.

27 Claims, 14 Drawing Figures

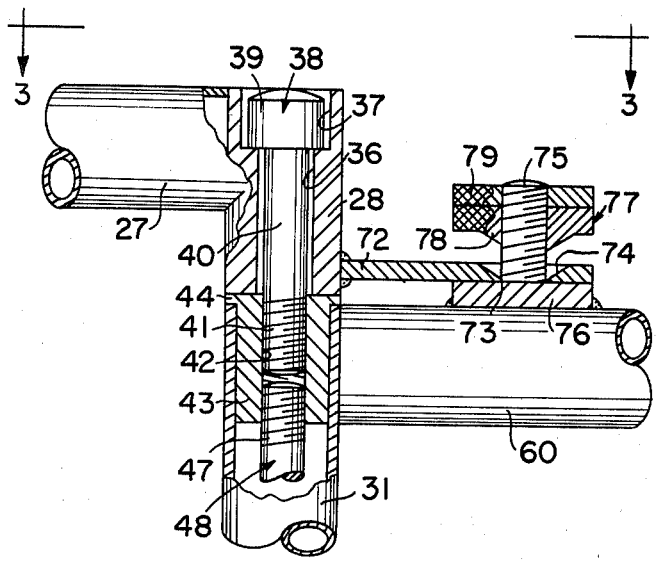

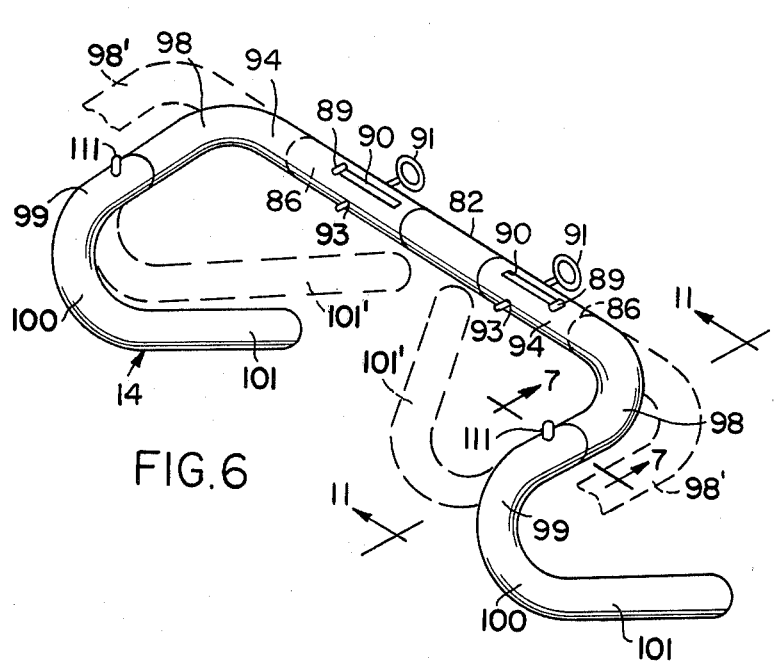
FIG.6
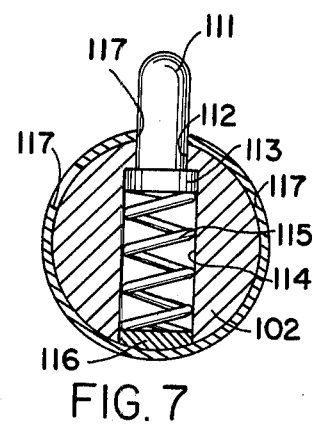
FIG.7
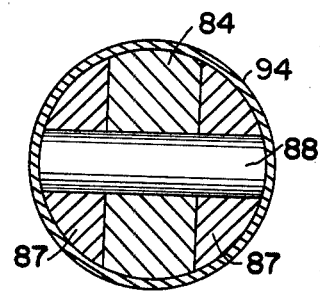
FIG.10
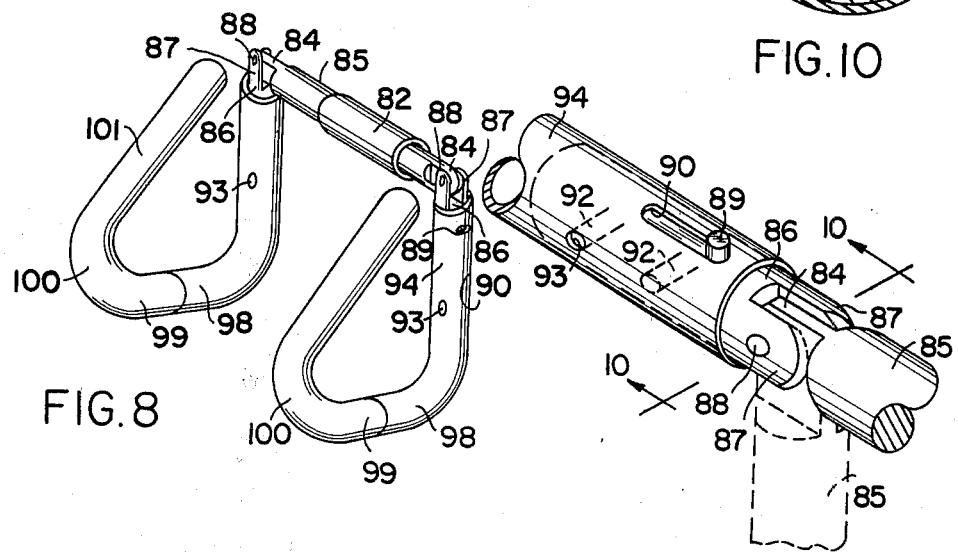
FIG.8
FIG.9
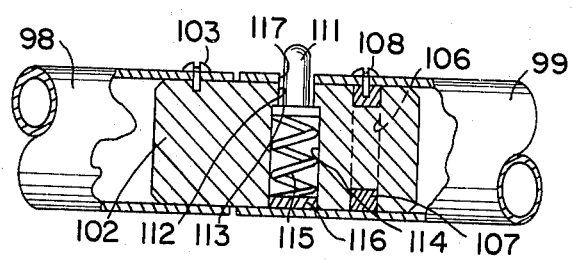
FIG.11

FOLDING BICYCLE

TECHNICAL FIELD

This invention relates generally to the bicycle art, and more particularly, to the folding bicycle art. The principles of the folding bicycle of the present invention are adapted to be incorporated with features of many standard bicycles, including large-wheel bicycles.

BACKGROUND ART

It is known in the bicycle art to provide folding bicycles. A disadvantage of the prior art folding bicycles is that they are mostly small-wheel folding bicycles. Heretofore, there have been some large-wheel folding bicycles available. However, the prior art large-wheel folding bicycles have been found to be costly to make, and awkward to fold to a collapsible position. The prior art large-wheel collapsible bicycles were designed as tourist bicycles and not commuter type bicycles which could be quickly and easily folded to a collapsed position for easy carrying, as for example, for carrying onto a bus or a train. Some of the prior art large-wheel folding bicycles employ hinge structures of various types which have protruding objects that pose hazards to the users of such designs. Other disadvantages of the prior art large-wheel folding bicycles is that they require a large amount of time to make the necessary disassembly operations to collapse the bicycle into a carrying position. Further disadvantages of the prior art large-wheel designs is that they are not constructed to be collapsed to a small, compact size when in the folded or collapsed position. Further disadvantages of the prior art folding bicycles is that they are heavy in weight, require many tools to carry out the folding and collapsing operations, and many specialized operations are required in the construction of the same.

DISCLOSURE OF THE INVENTION

The folding bicycle of the present invention comprises a large-wheel folding bicycle which exactly duplicates the looks, and feel, rigidity, strength, weight and ride quality of a conventional and popular 10/12 speed touring bicycle, and it folds into an easily carried 36"×36"×12" package. The folding bicycle of the present invention includes a hinged frame which is foldable, with the front half of the frame being rotatable about a hinge means to position it against the rear half of the bicycle for easy and efficient transportation. The folding bicycle of the present invention is adapted to be inserted into a carrying bag, if desired. The handlebars employed with the folding bicycle of the present invention are foldable into a collapsed position and the pedals are reversible.

The folding bicycle of the present invention can be folded, or unfolded, by a user within a short time period, as for example, thirty seconds. No tools are required for a folding or unfolding operation. The frame is provided with lock means for positively and rigidly locking the frame in the unfolded, operative position, so that there is no looseness or movement between the front and rear halves of the bicycle when it is in the unfolded, operative position. The handlebars fold within a time period of a few seconds, from the extended operative configuration of approximately 16"×8"×8", to a very compact 6"×7"×7" package. It also has the unique feature of having the handlebars being instantly adjustable from the standard 10 speed riding configuration to the more relaxed touring handlebar configuration.

The pedals employed with the folding bicycle of the present invention are instantly reversible, and they are "tucked in" for storage and carrying purposes when the bicycle frame is in the folded position. The "tucked in" configuration reduces the overall pedal-to-pedal width from 16" in the operating position to 6" in the "tucked in" position. The foldable handlebars and reversible pedals employed in the invention are designed to be used in any standard bicycle. An adjustable "soft ride" seat post is also employed with the folding bicycle of the present invention.

When folded, three of the folding bicycles may fit into the trunk of a full size automobile. The folding bicycle may be made to any size, as for example, a 21" frame with 26" wheels, a 24" frame with 27" wheels, and so forth. The folding bicycle may be provided with a standard brake apparatus, or with the usual 10 speed derailleur and other components.

BRIEF DESCRIPTION OF THE DRAWINGS

FIG. 2 is a fragmentary, elevational view, partly in section, and showing the upper end portion of the hinge structure for connecting the front and rear halves of the bicycle together.

FIG. 3 is a fragmentary, top plan view of the hinge structure shown in FIG. 2, taken along the line 3—3 thereof, and looking in the direction of the arrows.

FIG. 4 is a side elevation view of the collapsible bicycle frame employed in the invention, with the wheels, pedals, seat, and other associated equipment removed.

FIG. 5 is a fragmentary, side elevation view of the lower end portion of the hinge structure employed in the invention for hingedly connecting the front and rear halves of the bicycle together.

FIG. 6 is a perspective view of the folding handlebar structure employed in the invention.

FIG. 7 is an enlarged, elevation section view of the handlebar structure illustrated in FIG. 6, taken along the line 7—7 thereof, and looking in the direction of the arrows.

FIG. 8 is an elevational perspective view of the foldable handle bar structure illustrated in FIG. 6, and showing the handlebars moved to a folded, collapsed position.

FIG. 9 is a fragmentary, enlarged, elevational perspective view of the partially foldable handlebar structure illustrated in FIGS. 6 and 8.

FIG. 10 is an enlarged, elevation section view of the handle bar structure illustrated in FIG. 9, taken along the line 10—10 thereof, and looking in the direction of the arrows.

FIG. 11 is a fragmentary, enlarged, elevation section view of the foldable handlebar structure illustrated in FIG. 6, taken along the line 11—11 thereof, and looking in the direction of the arrows.

BEST MODE OF CARRYING OF THE INVENTION

Figure 1:
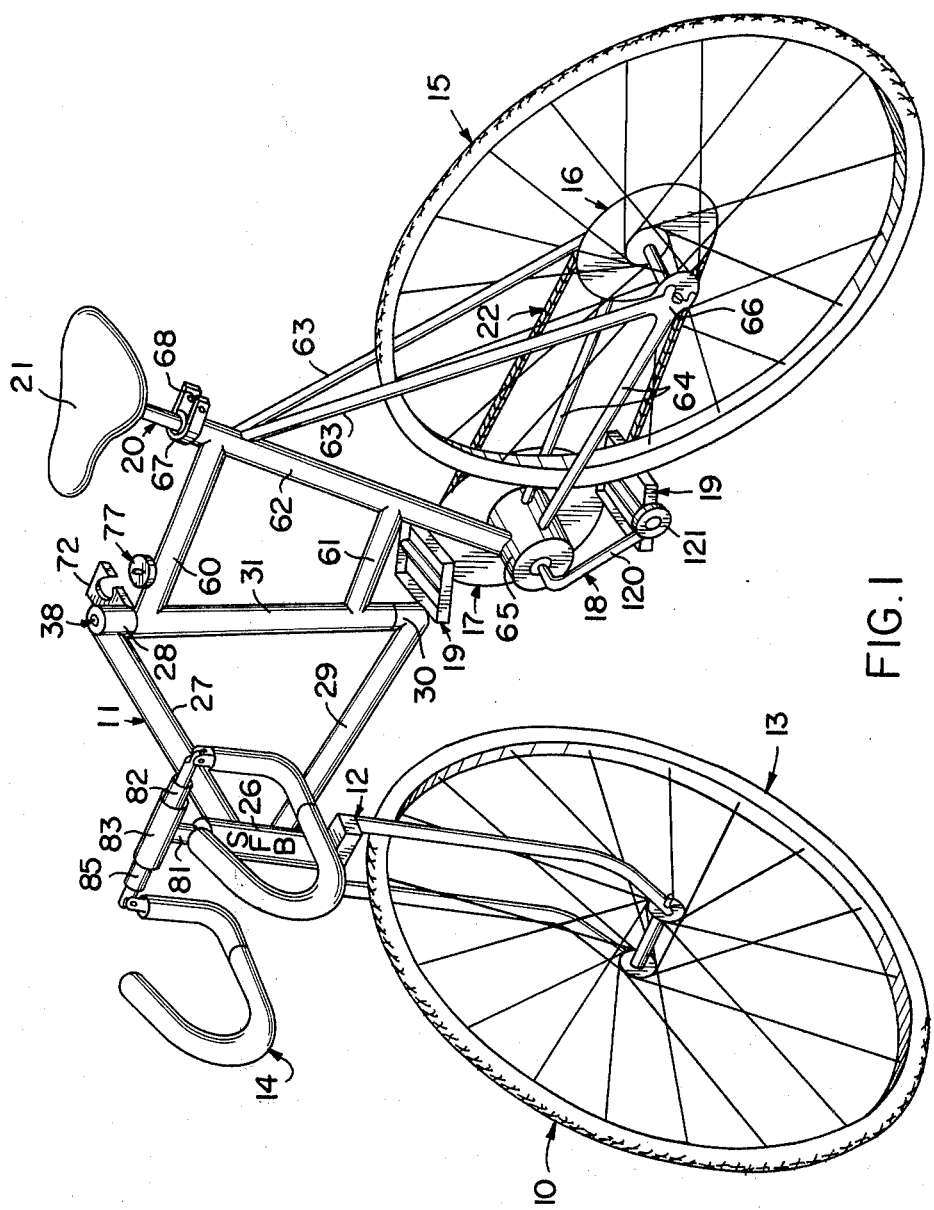
FIG. 1 is an elevational, perspective view of a folding bicycle made in accordance with the principles of the present invention, and showing the bicycle in a partially collapsed condition, with the front half of the bicycle pivoted to a partially collapsed position relative to the rear half of the bicycle.

Referring now to the drawings, and in particular to FIG. 1, the numeral 10 generally designates a folding bicycle made in accordance with the principles of the present invention. The folding bicycle 10 includes a unique folding frame, generally indicated by the numeral 11. A conventional fork assembly, generally indicated by the numeral 12, operatively supports a conventional rotatable front wheel, generally indicated by the numeral 13. The numeral 14 generally designates a unique folding handlebar set employed in the invention. A conventional rear wheel is generally indicated by the numeral 15, and it is operatively mounted on the rear end of the frame 11, and it is operatively attached to a conventional derailleur apparatus, generally indicated by the numeral 16. The derailleur apparatus 16 is operatively connected by the usual bicycle chain 22 to a mating conventional derailleur sprocket, generally indicated by the numeral 17. The sprocket 17 is operatively connected to a conventional crank set 18 which is provided with a pair of pedals 19. The numeral 20 generally indicates a unique seat mounting tube on which is operatively supported a soft-ride seat 21.

As shown in FIG. 4, the folding frame 11 includes the usual head or fork tube 26 to which is fixedly secured, as by welding, the front end of a front horizontal top tube 27. Fixedly attached, as by welding, to the rear end of the front top tube 27 is a downwardly extended short rotatable hinge upper tube 28. The hinge upper tube 28 is secured to the top tube 27 at a right angle thereto. A downwardly sloping down tube 29 has its front end fixedly secured, as by welding, to the head or fork tube 26. Fixedly secured, as by welding, to the rear end of the down tube 29 is a rotational hinge lower tube 30 which is vertically disposed in alignment with the hinge upper tube 28, but in a position spaced downwardly therefrom.

As shown in FIGS. 2, 4 and 5, a vertically disposed rotatable hinge central tube 31 is operatively mounted between the upper and lower hinge tubes 28 and 30, respectively. As shown in FIG. 2, the upper end of the hinge structure includes an axial bore 36 formed through the hinge upper tube 28 from the lower end thereof. The bore 36 communicates with an enlarged diameter bore 37 in the upper end of the hinge upper tube 28. A bolt, generally indicated by the numeral 38, is operatively mounted in the bores 36 and 37. The bolt 38 includes a head 39 which is seated in the enlarged diameter bore 37. The body 40 of the bolt 38 extends through the bore 36. The lower threaded end 41 of the bolt 38 is threadably mounted in a threaded bore 42 formed in a cylindrical bushing 43. The bushing 43 is mounted in the upper end of the hinge central tube 31, by a rotational fit, and it is provided with a flange 44 on the upper end thereof. As shown in FIG. 2, the flange 44 extends over the upper end of the hinge central tube 31 and engages the upper end of said tube, and it is seated against the lower end of the hinge upper tube 28. The bolt 38 is tightened so as to hold the bushing 43 in a fixed position against the lower end of the hinge upper tube 28. The hinge vertical, central tube 31 is fitted around the periphery of the bushing 43 with a rotational fit to permit rotation of the tube 31 about the bushing 43. The bushing 43 may be made from any suitable metal, plastic or other bearing material.

As shown in FIGS. 2 and 5, a central elongated connecting rod, generally indicated by the numeral 48, is axially mounted through the hinge vertical central tube 31. The upper end 47 of the connecting rod 48 is threaded, and it is threadably mounted in the lower end of the threaded bore 42 in the bushing 43. As shown in FIG. 5, the lower threaded end 49 of the connecting rod 48 is threadably mounted in a threaded bore 50 formed in a lower hinge bushing 51. The lower bushing 51 is constructed in the same manner as the upper bushing 43, but it is disposed in a reverse manner, with the flange 52 seated downwardly and on the upper end of the hinge lower tube 30. The lower hinge bushing 51 is fixedly secured to the hinge lower tube 30 by a bolt, generally indicated by the numeral 54. The bolt 54 includes a head 56 to which is fixedly attached a bolt body 57 that extends through a bore 55 formed axially through the lower bushing 30. The bolt head 56 is seated in an enlarged diameter bore 58. The bolt 54 includes the threaded outer end 53 which is threadably mounted in the threaded bore 50 in the lower hinge bushing 51.

In assembling the last described hinge structure, one of the bushings, as for example the top bushing 43 with the rod upper end 47 threadably mounted in the bushing bore 42, would be inserted in the hinge vertical central tube 31. The lower bushing 51 would then be threaded onto the lower end 49 of the connecting rod 48. The structure thus assembled would then be moved between the upper and lower tubes 28 and 30, and the bolts 38 and 54 operatively mounted in place to form the novel hinge structure of the frame 11.

It will be seen from FIG. 4 that the novel frame 11 includes a front triangular portion formed by the tubes 26 through 31, and a rear triangular portion formed by the tubes 62 through 64. The front triangular portion is interconnected with the rear triangular portion by means of the top tube 60 and the bottom tube 61. It will be understood that all of the aforementioned tube members of the frame 11 are preferably made from a suitable steel.

As shown in FIG. 4, the upper end of the seat tube 62 extends a slight distance above the upper end of the seat stay tubes 63. Operatively mounted on the upper end of the seat stay tube 62 is a conventional seat tube clamp 67 which is adapted to clamp the seat post 143 (FIG. 13) in a desired adjusted position in the seat stay tube 62. The seat tube clamp 67 is provided with a locking bolt 68 for exerting a clamping action on the seat post 143.

Fixedly attached to the rear side of the vertical hinge tube 31, as by welding, is a rear top horizontal tube 60 and a rear bottom horizontal tube 61. The rear top tube 60 is longer than the rear bottom tube 61. The rear ends of the tubes 60 and 61 are fixedly connected, as by welding, to the front side of the downwardly and forwardly sloping seat tube or seat mast 62. As shown in FIG. 1, a pair of conventional seat stay tubes 63 have their upper ends fixedly secured, as by welding, to the rear side of the seat tube 62, at a point above the connection point with the rear top tube 60. The seat stay tubes 63 are angled downwardly and rearwardly, and they are fixedly secured to a conventional rear fork or drop-out 66.

The frame 11 further includes a pair of chain stay tubes 64 which are fixedly connected, as by welding, at their rear ends to the rear forks 66. The front ends of the chain stay tubes 64 are fixedly connected, as by welding, to a conventional bottom bracket or tubular crank set housing 65. The bottom bracket 65 is fixedly secured, as by welding, to the lower end of the seat tube 62. It will be seen from FIG. 1, that the fork assembly 12 operatively supports the front wheel 13 in the usual manner. It will also be seen from FIG. 1 that the rear wheel 15 is operatively supported in the usual manner between the seat stay tubes 63 and the chain stay tubes 64.

As shown in FIGS. 2 and 3, the locking means for locking the front triangular portion of the frame to the rear triangular portion of the frame includes an elongated locking arm or plate 72 which has its front end fixedly attached to the rear side of the hinge upper tube 28 by any suitable means, as by welding. The locking arm 72 is provided with a U-shaped opening on the left side thereof, as viewed from the top of the locking arm 72 (FIG. 3). A circular, concave recess 74 is formed in the top surface of the locking arm 72 around the U-shaped opening 73. A vertical locking bolt 75 has its lower end fixed, as by welding, to the upper side of a short mounting plate 76. The mounting plate 76 is fixed to the upper surface of the rear top tube 60, as by welding. When the front triangular frame portion is aligned in the operative position, as shown in FIGS. 3 and 4, the locking arm 72 receives the locking bolt 75 within the U-shaped opening 73. The locking arm 72 is then releasably and securely locked to the plate 72 on the rear triangular frame portion by a round, knurled lock nut, generally indicated by the numeral 77. The knurled lock nut 77 is formed on the lower side thereof with a circular, convex, depending portion which is adapted to be seated against the surface of the circular, concave recess 74 on the mounting plate 76, to provide an efficient friction locking action between the locking arm 72 and the lock nut 77. A second round, knurled lock nut 79 is operatively mounted on the outer end of the bolt 75 for locking engagement with the outer end surface of the first lock nut 77, to provide additional locking security against accidental releasing of the lock nut 77.

The novel folding handlebar structure employed in the invention includes a conventional steering column post 81 which is operatively mounted in the fork assembly 12 in the conventional manner. The steering column post 81 carries a fixedly mounted transverse mounting tube 83 which has clamped therein a horizontal tube 82 mounted between a pair of laterally spaced apart hinge arms 87 which are pivotally attached to each adjacent hinge tongue 84 by a suitable pivot pin 88, such as a roll pin. Each pair of laterally spaced apart hinge arms 87 comprises a bight portion of each hinge assembly, and they are integrally attached to a cylindrical hinge bar 86.

Each of the hinge bars 86 is slidably mounted in a handlebar tube portion 94 which, in the operative position shown in FIG. 6, has its inner end in abutting engagement with one of the outer ends of the handlebar horizontal tube 82. When each of the handlebar tubes 94 is moved laterally outward from the operative position shown in FIG. 6, to the position shown in FIG. 9, then each of the handlebar tubes 94 may be moved downwardly to the positions shown in FIG. 8, since the hinge tongues 84 and hinge arms 87 are free to be pivoted relative to each other. When the tubes 94 are in the operative position shown in FIG. 6, the hinge assemblies formed by the hinge tongues 84 and hinge arms 87 are each locked in an aligned position. The dotted line position of the bar 85 in FIG. 9 shows the bar 85 moved downwardly to the position shown in FIG. 8, to one of the steps for folding the handlebars to a collapsed position.

The longitudinal movement of each of the tubes 94 is limited by a retainer pin 89 which is fixedly mounted in each of the hinge bars 86 and extended radially outward therefrom. Each of the retainer pins 89 extends through a longitudinal slot 90 formed in each of the tubes 94. When the tubes 94 are moved to the operative position shown in FIG. 6, they are each retained in that position by a separate transversely disposed safety detent pin 91. Each of the detent pins 91 is adapted to be extended through holes 93 formed through each of the tubes 94 and a bore 92 formed through each of the hinge bars 86. When each of the tubes 94 is moved to the operative position shown in FIG. 6, the bore 92 in each of the bars 86 is aligned with the mating holes 93 in the tube 94 for acceptance of one of the detent pins 91. The outer ends of each of the retainer pins 89 may be enlarged to form a retainer head thereon.

As shown in FIGS. 6 and 8, each of the tubes 94 is integrally connected at its outer ends by a U-shaped tube to an integral short tube 98 that is disposed at right angles to each of the tubes 94. Each of the tubes 98 is connected to an aligned handlebar tube 99 by a rotary hinge structure. The end of each straight tube portion 99 is integrally attached by a U-shaped tube portion 100 to a straight handlebar tube portion 101. The handlebar tube portions 101 are the actual tube portion of the handlebar structure which are engaged by the hands of a bicycle rider.

The rotary hinge structures for attaching each of the handlebar tubes 98 to the adjacent handlebar tube 99 are identical, and they are illustrated in FIG. 11. As shown in FIG. 11, a cylindrical hinge block 102 has one end slidably mounted in the outer end of a tube 98, and it is fixed thereto by a plurality of suitable set screws 103. The other end of the rotary hinge block 102 is slidably mounted in the adjacent end of the adjacent tube 99. The portion of the rotary hinge block 102 that is seated inside of the tube 99 is provided with a peripheral, rectangular groove 106 in which is rotatably mounted a nylon ring 107. The nylon ring 107 would be made in parts so as to be mounted in the groove 106. The various parts of the nylon ring 107 are fixedly secured to the tube 99 by a plurality of suitable set screws 108. It will be seen that the last described structure permits the tube 99 to be rotated relative to the end of the rotary hinge block 102 that is mounted therein.

Rotation of the tube 99 relative to the rotary hinge block 102 is selectively permitted by depressing a push button 111, as shown in FIG. 11. The push button 111 is mounted through a hole 117 formed through the tube 99, and it extends inwardly into a bore 112 in the rotary hinge block 102. A flange 113 is fixedly mounted on the inner end of the push button 111, and it is slidably mounted in an enlarged diameter bore 114 which communicates with the bore 112. The bore 114 extends through the block 101. A spring 115 is mounted in the bore 114 with its one end abutting the flange 113, and the other end seated on a plate 116 that is mounted in the bore 114. The plate 116 is biased into rotary sliding engagement with the inner surface of the tube 99. It will be seen that the handlebar tube portions 99 through 101 are each retained in their operative position shown in FIG. 6 when the push button 111 is biased outwardly by the spring 115 through a bore 117 in the tube 99. When it is necessary to fold the handlebar structure into a collapsed folded condition, the push buttons 111 are depressed to permit the handlebar tube portions 99 through 100 to be rotated inwardly to the broken line position shown by the numerals 101' in FIG. 6. It will also be seen that by providing a plurality of holes 117 around the periphery of the tubes 99, that the handlebar tube portions 99 through 101 can be rotated to a selected handlebar configuration desired by a user. The handlebar portions 99 through 101 can be rotated from the folded position shown in FIG. 8 to a comfortable upright position, or to any combination of handlebar positions that is desired. The push button pins 111 will provide a positive and secure lock for each of the handlebar tube portions 99 through 101, for any desired adjusted position.

As shown in FIG. 6, the safety detent pins 91 can be pulled from their nested position so as to release the tubes 94 for longitudinal outward movement on the ends of the horizontal hinge bar 86. The tubes 94 may then be slid sidewardly outward to the broken line positions shown in FIG. 6 and indicated by the numerals 98'. The tubes 94 may then be swung downwardly to the position shown in FIG. 8, and the safety pins 91 reinserted through a second transverse bore 92 formed through the bars 86 and through the holes 93 in the tubes 94 to lock the tubes 94 in the folded position, as shown in FIG. 8.

It will be seen that the folding handlebar 14 of the present invention may be used on any conventional bicycle to conserve space, since they may be folded into a package size of approximately 7"×7"×6" from an extended size of 16"×8"×8". A standard bicycle hand brake may be attached to the twisting or rotary hinged tube portions 99 through 100 of one of the folding handlebars, and it can be safely and conveniently operated even though the handlebar is in any of the aforedescribed conceivable and variable rotary positions.

The folding action of the folding handlebars allows the handlebars to be folded downward to an anle of about 120 degrees from the horizontal position. It will be seen that the folding hinge structure 84 and 87 is uniquely designed to fit inside of the handlebar tubes 94, and it is completely concealed from view when in the operative and non-folded position shown in FIG. 6. The last mentioned action allows the sliding handlebar tubes 94 to completely enclose the hinge members 84 and 87 to provide a positive locking action on them when the handlebar structure is in the operative position shown in FIG. 6, and a close fit in tolerance prevents the hinge members 84 and 87 from moving in any direction when the handlebars are in the non-folded and operative position shown in FIG. 6. The slots 90 control the total distance that the tubes 94 can move, and they also prevent the sliding tubes 94 from rotating in either direction.

Figure 12:
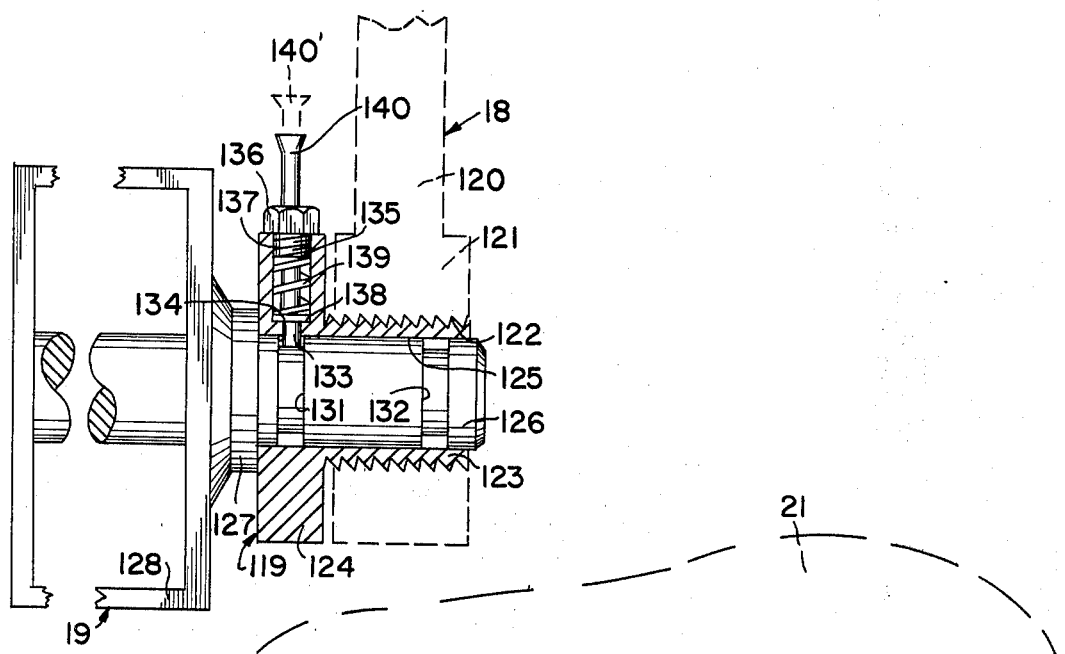
FIG. 12 is a fragmentary, broken, elevational view of the reversible pedal structure employed in the invention, and with parts in section.

The unique structure that comprises the reversible bicycle pedals is illustrated in FIG. 12. The numeral 120 designates a conventional bicycle crank which has integrally formed on the outer end thereof a conventional hub 121. Horizontally formed through the hub 121 is a standard threaded bore 122, which is normally a ½" 20 normally fine thread. An adaptor, generally indicated by the numeral 119, is permanently mounted in the threaded bore 122. The adaptor 119 includes an adaptor shaft 123 which has a threaded periphery that is threadably mounted in the threaded bore 122. The adaptor shaft 123 is integrally attached to an annular flange 124. An axial bore 125 is formed through the shaft 123 and the flange 124. A pedal shaft 126 is slidably mounted in the bore 125, and it is integrally attached at its outer end to a conventional pedal hub 127 on which is rotatably mounted, in a conventional manner, a conventional pedal 128.

The pedal 128 is releasably mounted in the adaptor 119 by the following described structure. As shown in FIG. 12, the pedal shaft 126 is provided with a pair of longitudinally spaced apart peripheral grooves 131 and 132. When the pedal 128 is in the operative position shown in FIG. 12, a locking pin 133 has its inner end extended down into the peripheral groove 131 to releasably hold it in place. The locking pin 133 is mounted in the flange 124 through an enlarged diameter bore 135 which is extended radially inward from the outer periphery of the flange 124, and into communication with a reduced diameter bore 134 that communicates with the shaft axial bore 125. The outer end of the locking pin 120 is slidably mounted through an axial bore in a fitting 137 that is threadably mounted in the outer end of the bore 135. The fitting 137 has an outer enlarged head 136 which is shaped as a nut to permit the same to be rotated by means of a suitable wrench. The extreme outer end of the pin 133 is indicated by the numeral 140, and it is enlarged to provide a handle means for grasping the pin to move it outwardly and upwardly, against the pressure of a spring 139, to the released position indicated by the numeral 140'.

The spring 139 is mounted in the bore 135, and its upper end is seated against the fitting 137, and the lower end is seated on a snap ring 138 which is releasably attached to the pin 133. The spring 139 normally biases the locking pin 133 inwardly into locking engagement with either one of the grooves 131 or 132. When it is desired to reverse the position of the pedal 128, the pin 133 is pulled outwardly to the released position shown by the numeral 140' in FIG. 12, and the shaft 126 is then moved into the bore 125 from the right side of the crank hub 121, as viewed in FIG. 12, and the locking pin 133 is then released to engage the groove 132 and lock the pedal in the reversed position. FIG. 1 shows one of the pedals in a reversed position. It will be understood that both pedals 128 would be mounted in the same structural manner as shown in FIG. 12, so that both of the pedals are reversible.

It will be understood that the reversible pedals 128 can be used on any standard bicycle, as well as on any 10 speed bicycle. The adaptor 119 is capable of being threaded into the bore in the crank set of any existing standard bicycle. The pedal shaft 126 is machined to provide a slip-fit into the threaded adaptor shaft 123 from either the front or operating position, or the rear or storage position. The groove 131 is adapted to function with pin 133 so that no amount of horizontal force component exerted by pedal pumping input will unlock the pedal shaft 123 and allow the pedal shaft 126 to pull out of the bore 125 during a biking operation. When the reversible pedals 128 are in the storage position nested between the frame and wheel components, the overall pedal to pedal width is reduced from about 16" in the operating position to about 6" in the storage position. Standard bicycle pedals must be purchased in pairs because of the right and left hand threads which must be present on the pedals. However, the reversing bicycle pedals of the present invention are identical and can be used on either the right or left side of a bicycle. Only the adaptors 119 are non-reversing.

Figure 14:
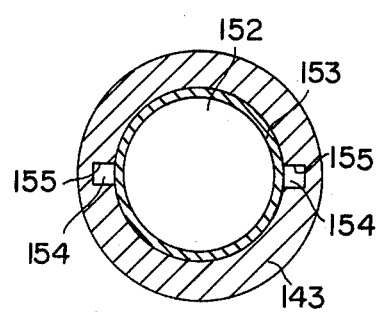
FIG. 14 is an enlarged, horizontal section view of the seat mounting structure illustrated in FIG. 13, taken along the line 14—14 thereof, and looking in the direction of the arrows.
Figure 13:
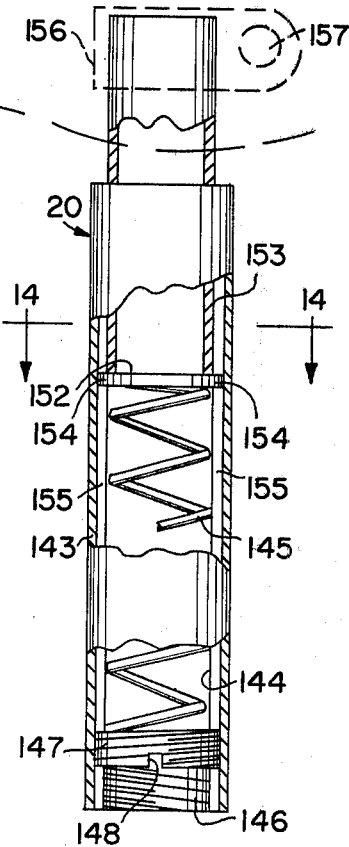
FIG. 13 is an elevation view, with parts broken away, of the seat mounting structure employed in the invention.

FIGS. 13 and 14 illustrate the unique structure of the adjustable seat post employed in the invention. The numeral 143 designates a seat post which is adapted to be mounted in the frame seat stay tube 62 and secured in a vertically adjusted position by the clamp 67 and clamp bolts 68 (FIG. 4). The seat post 143 has an axial bore 144 formed inwardly from the upper end thereof. The lower end of the bore 144 is threaded, as indicated by the numeral 146. Threadably mounted in the threaded bore portion 146 is a threaded nut 147 which is provided with a screwdriver slot 148 for rotating the nut 147. The nut 147 abuts the lower end of a spring 145. The upper end of the spring 145 is seated against a plate 152 which is attached to the lower end of a seat post 153. The plate 152 is provided with a pair of integral and oppositely disposed, and radially outwardly extended, ears 154. As shown in FIGS. 13 and 14, the plate ears 154 are slidably mounted in a pair of oppositely disposed longitudinal guide slots 155. A suitable bicycle seat 121, provided with an attachment clamp 156, is mounted on the seat post 153 by means of the clamp 156 and a clamp bolt 157.

It will be seen that the spring loaded seat support structure illustrated in FIGS. 13 and 14 may be used on any type bicycle, and that it cushions road shock from the bicycle frame, the wheel and road, and prevents it from being transmitted to the bicycle seat 21 and the rider thereon. The compliance or ride can be adjusted infinitely to suit the riders needs and weight by adjusting the threaded adjustment nut 147. The seat post 153 is restrained from movement in all lateral directions, but it is permitted to move axially along the plane of the tubes 153 and 143 by means of the guide ears 154 and guide slots 155. The seat inner post 153 is adapted to move freely and axially within the outer seat post 143. The axially adjustable nut 147 compresses the spring 145 to selectively adjust the spring force, as desired.

It will be seen that the unique frame 11 of the present invention is designed to fold centrally so that the front and rear axles of the bicycle are substantially in alignment when the frame is in the folded position. The frame 11 of the present invention retains the rigidity, strength, ride quality and other inherent qualities of conventional non-folding bicycle frames. The vertical hinge tube 31 comprises a carrrying handle when the bicycle is in the folded position. It should be understood that the folding frame 11, the folding handlebar structure 14, and the reversible pedals 19 may also be used with standard bicycles as well as with 10 speed bicycles.

The frame locking structure employed in the invention is positive in its locking action, and it rigidly holds the frame 11 in a straight position with zero deflection and zero movement during use of the bicycle of the present invention. The hinge structure employed in the frame 11 is substantially enclosed within the tubes 28, 30 and 31 to protect the hinge structure from the weather elements. The front triangular portion of the frame 11 can be removed from the rear triangular portion without disassembling the hinge structure to facilitate repair to either portion of the frame, since the frame portions may be separated by merely removing the bolts 38 and 54 without disassembling the hinge rod 48 from the bushings 43 and 51. It will also be seen that the length of the wheel base of folding frame 11 can be changed easily by inserting a different size front frame section comprising the tubes 27, 29 and 31. The rear top tube 60 is lowered about two inches below the front top tube 27 to enable the front and rear top tubes to nest while in the folded position. The lower horizontal tube 61 functions as a stop member when the front triangular portion is folded to prevent the front wheel axle from penetrating the rear wheel and damaging the spokes of the rear wheel when the frame portions are in the folded position.

The lower, stepped rear top tube 60 also allows a rider with short legs to ride the bicycle since it provides more crotch clearance and serves the same purpose as a girl's bicycle does in lowering the top tube of such a bicycle.

The hinge structure in the frame 11 is structurally the strongest member in the frame because of its hidden inner hinge rod 48 which can be put under a high constant tensile load prior to be installed as a vertical hinge. This is accomplished by the amount of tightenting exerted on the rod 48 by the threadably mounted bushings 43 and 51. While the inner hinge member or rod 48 is under such a high tensile load, the outer tubular member 31 is under high compressive load. This pre-load on the outer tubular member 31 enhances the strength of the hinge member because any dynamic loading must exceed the pre-load on the tube 31 in order to become a factor in the frame 11. In effect, the vertical hinge member 31 is pre-stressed. Structurally, the frame 11 is comprised of two interconnected triangular portions, and it is well known that a triangular structure is one that is structurally rigid. The hinge means is an integral part of the front triangular portion of the folding bicycle. The hinge rod structure of the hinge means is hidden with no apparent visible means of operation. The hinge means does not include any side protrusions, and when it is in the locked position it adds greatly to the frame strength and rigidity. The frame 11 is highly resistant to torque because the hinge extends the full height of the triangular front portion of the frame. Because of the frame's inherent high torque resistance, frame whip, frame twist, and frame flexibility are greatly reduced.

INDUSTRIAL APPLICABILITY

The folding bicycle of the present invention is adapted for commuter use or tourist use. The folding bicycle frame of the invention may be used in standard bicycles or 10 speed type bicycles. The folding handlebars and reversible pedals may also be used in either standard bicycles or 10 speed type bicycles.

I claim:
1. A folding bicycle which includes a folding frame, front and rear wheels operatively mounted on the frame, a handlebar assembly, a seat mounted on the frame, a crankset with a pair of pedals and sprocket and a chain drive apparatus, characterized in that the folding frame includes:
 (a) a frame front portion;
 (b) a frame rear portion;
 (c) hinge means forming a part of the frame front portion;
 (d) means connecting said hinge means to said frame rear portion;
 (e) said frame front portion includes a plurality of interconnected tubes;
 (f) said hinge means includes a swingably mounted hinge tube as one of the frame front portion plurality of tubes; and

(g) said hinge means includes an upper bushing and a lower bushing carried in said hinge tube, and means inside of said hinge tube for interconnecting said bushings.

2. A folding bicycle as defined in claim 1, characterized in that:

(a) said means inside of said hinge tube for interconnecting said bushings includes means for exerting a tension on the bushings and a compression on said hinge tube.

3. A folding bicycle which includes a folding frame, front and rear wheels operatively mounted on the frame, a handlebar assembly, a seat mounted on the frame, a crankset with a pair of pedals and sprocket and a chain drive apparatus, characterized in that the folding frame includes:

(a) a frame front portion;
(b) a frame rear portion;
(c) hinge means forming a part of the frame front portion;
(d) means connecting said hinge means to said frame rear portion;
(e) said frame front portion includes a plurality of interconnected tubes;
(f) said hinge means includes a swingably mounted hinge tube as one of the frame front portion plurality of tubes;
(g) said hinge means includes an upper bushing and a lower bushing carried in said hinge tube, and means inside of said hinge tube for interconnecting said bushings;
(h) said means inside of said hinge tube for interconnecting said bushings includes means for exerting a tension on the bushings and a compression on said hinge tube; and,
(i) said hinge means includes means for releasably attaching each of said upper and lower bushings to one of the other tubes on said frame front portion.

4. A folding bicycle as defined in claim 3, characterized in that:

(a) said frame front and rear portions are each substantially triangular in elevation configuration; and,
(b) said frame front and rear portions are interconnected by a plurality of tubes.

5. A folding bicycle as defined in claim 4, characterized in that:

(a) said frame front triangular portion includes, a top tube, a down tube, a hinge upper tube attached to the rear end of the top tube, a lower hinge tube attached to the rear end of the down tube, and said means for releasably attaching each of said upper and lower bushings to one of the tubes on said front frame portion comprises releasable threaded attachment means for attaching the upper and lower bushings to said upper and lower hinge tubes, respectively.

6. A folding bicycle as defined in claim 5, characterized in that:

(a) said frame front triangular portion top tube is horizontally disposed when the frame is in an upright vertical position, and said means for connecting the hinge means to the frame rear portion includes a pair of horizontal tubes which are vertically spaced apart with their front ends attached to the hinge tube and their rear ends attached to the frame rear portion.

7. A folding bicycle as defined in claim 6, characterized in that:

(a) the upper one of said pair of horizontal tubes is disposed downwardly from said frame front triangular portion top tube.

8. A folding bicycle as defined in claim 7, characterized in that:

(a) said frame is provided with locking means for releasably locking said frame front portion to said frame rear portion.

9. A folding bicycle as defined in claim 8, characterized in that:

(a) said locking means includes a locking arm fixedly mounted on one of said frame front and rear portions, and a bolt and lock nut means mounted on the other of said frame front and rear portions for releasable locking engagement with said locking arm.

10. A folding bicycle as defined in claim 9, characterized in that:

(a) said locking arm is provided with a U-shaped opening on one side thereof for reception of said bolt when the frame is in the unfolded, operative position, said locking arm is further provided with a concave recess around said U-shaped opening, and said lock nut means includes at least one lock nut having a convex extension on one end thereof for mating engagement with said concave recess on said locking arm when the lock nut is moved to a locked position to lock the frame front and rear portions together.

11. A folding bicycle as defined in claim 8, characterized in that:

(a) an adaptor is operatively mounted between each of said pair of pedals, and a crank hub on said carnk set for releasably and reversibly mounting each pedal on a crank set hub.

12. A folding bicycle as defined in claim 11, characterized in that:

(a) each of said adaptors is provided with a flange and an integral shaft, and said shaft is threadably mounted in a crank set hub;
(b) each of said adaptors is provided with an axial bore formed through said flange and integral shaft; and,
(c) each of said pedals is provided with a shaft extended axially from one end thereof for slidable mounting in the axial bore in one of the adaptors.

13. A folding bicycle as defined in claim 12, characterized in that:

(a) each of the pedal shafts is provided with a plurality of grooves around the periphery thereof; and,
(b) each of said adaptors is provided with a releasable lock pin means for releasable locking engagement with one of the grooves on a pedal shaft for releasably locking the pedal in the crank set hub from either side therof.

14. A folding bicycle as defined in claim 8, characterized in that:

(a) said seat is attached to an inner seat post;
(b) said inner seat post is slidably and resiliently mounted in an outer seat post; and,
(c) said outer seat post is mounted on said frame rear portion.

15. A folding bicycle as defined in claim 14, characterized in that:

(a) said outer seat post includes spring means for resiliently mounting said inner seat post in said outer seat post.

16. A folding bicycle as defined in claim 15, characterized in that:
(a) said outer seat post includes means for adjusting the pressure on said spring means.

17. A folding bicycle as defined in claim 8, characterized in that:
(a) said handlebar assembly is a folding handlebar assembly and includes a transverse bar secured to said frame front portion;
(b) a hinge bar is attached by a hinge means to each end of said transverse bar;
(c) a first handlebar tube is slidably mounted over each of said hinge bars and inwardly over the adjacent end of the transverse bar when the handlebar assembly is in the unfolded position;
(d) a locking means releasably locks each of said first handlebar tubes to the transverse bar when the handlebar tubes are slid inwardly over the adjacent ends of the transverse bar; and,
(e) a second handlebar tube, having a handle portion thereon, is swivelly mounted to each of said first handlebar tubes.

18. A folding bicycle as defined in claim 17, characterized in that:
(a) said transverse bar and each of said first handlebar tubes includes means for limiting the sliding movement of each hinge bar.

19. A folding bicycle as defined in claim 18, characterized in that:
(a) said handlebar assembly includes a rotary hinge means for swivelly mounting each of said second handlebar tubes to one of said first handlebar tubes, and including means for releasably locking each of the second handlebar tubes to one of said first handlebar tubes in an adjusted position.

20. A folding bicycle frame characterized in that it includes:
(a) a frame front portion;
(b) a frame rear portion;
(c) hinge means forming a part of the frame front portion;
(d) means connecting said hinge means to said frame rear portion;
(e) said frame front portion includes a plurality of interconnected tubes;
(f) said hinge means includes a swingably mounted hinge tube as one of the frame front portion plurality of tubes; and,
(g) said hinge means includes an upper bushing and a lower bushing carried in said hinge tube, and means inside of said hinge tube for interconnecting said bushings.

21. A folding bicycle frame as defined in claim 20, characterized in that:
(a) said means inside of said hinge tube for interconnecting said bushings includes means for exerting a tension on said bushings and a compression on said hinge tube.

22. A folding bicycle frame characterized in that it includes:
(a) a frame front portion;
(b) a frame rear portion;
(c) hinge means forming a part of the frame front portion;
(d) means connecting said hinge means to said frame rear portion;
(e) said frame front portion includes a plurality of interconnected tubes;
(f) said hinge means includes a swingably mounted hinge tube as one of the frame front portion plurality of tubes;
(g) said hinge means includes an upper bushing and a lower bushing carried in said hinge tube, and means inside of said hinge tube for interconnecting said bushings;
(h) said means inside of said hinge tube for interconnecting said bushings includes means for exerting a tension on said bushings and a compression on said hinge tube; and,
(i) said hinge means includes means for releasably attaching each of said upper and lower bushings to one of the other tubes on said frame front portion.

23. A folding bicycle frame as defined in claim 22, characterized in that:
(a) said frame front and rear portions are each substantially triangular in elevation configuration; and,
(b) said frame front and rear portions are interconnected by a plurality of tubes.

24. A folding bicycle frame as defined in claim 23, characterized in that:
(a) said frame front triangular portion includes, a top tube, a down tube, a hinge upper tube attached to the rear end of the top tube, a lower hinge tube attached to the rear end of the down tube, and said means for releasably attaching each of said upper and lower bushings to one of the tubes on said front frame portion comprises releasable threaded attachment means for attaching the upper and lower bushings to said upper and lower hinge tubes, respectively.

25. A folding bicycle frame as defined in claim 8, characterized in that:
(a) said frame front triangular portion top tube is horizontally disposed when the frame is in an upright vertical position, and said means for connecting the hinge means to the frame rear portion includes a pair of horizontal tubes which are vertically spaced apart with their front ends attached to the hinge tube and their attached rear ends to the frame rear portion.

26. A folding bicycle frame as defined in claim 25, characterized in that:
(a) the upper one of said pair of horizontal tubes is disposed downwardly from said frame front triangular portion top tube.

27. A folding bicycle frame as defined in claim 26, characterized in that:
(a) said frame is provided with locking means for releasably locking said frame front portion to said frame rear portion.

* * * * *